April 22, 1941.    T. S. MORRIS    2,239,049
GRAVITY METER
Filed April 25, 1938
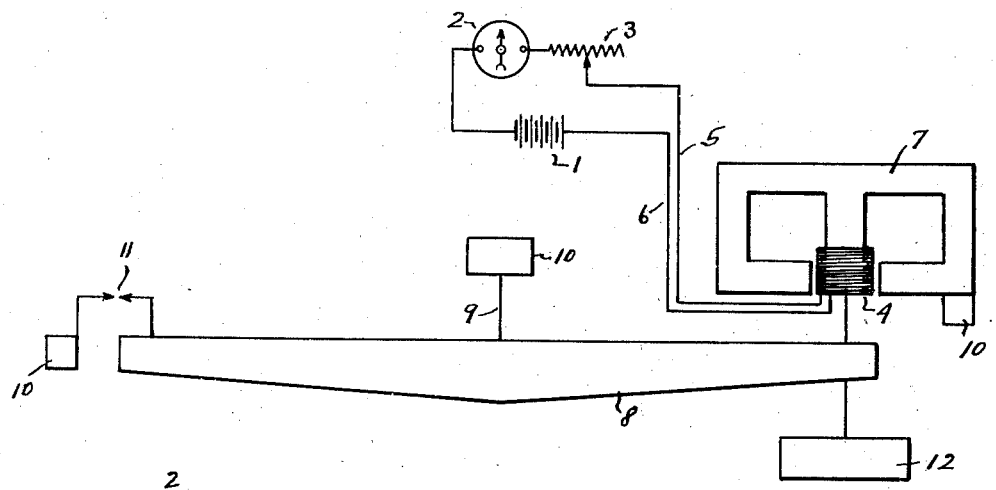
Fig.1.
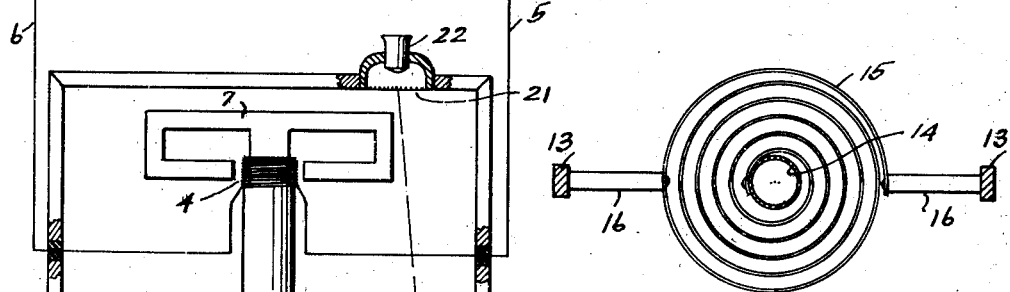
Fig.3.
Fig.2.
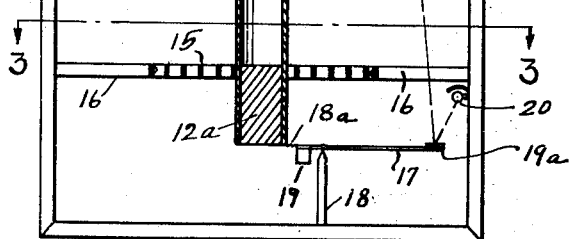
Inventor
Truman S. Morris
By
Edward V. Hardway
Attorney Patented Apr. 22, 1941

2,239,049

UNITED STATES PATENT OFFICE 2,239,049

GRAVITY METER

Truman S. Morris, Houston, Tex.

Application April 25, 1938, Serial No. 204,095

7 Claims. (Cl. 265—1.4)

This invention relates to a gravity meter.

An object of the invention is to provide means for indicating variations in the earth formation.

Another object of the invention is to provide a portable apparatus that can be readily moved from place to place and variations in the gravity influence at different locations readily ascertained and consequently variations in the formation beneath the surface of the earth readily determined.

The device is intended to be used primarily for locating oil or other minerals, although it is capable of use generally for indicating variations in the earth formation.

With the above and other objects in view, the invention has particular relation to certain novel features of construction, operation and arrangement of parts, an example of which is given in this specification and illustrated in the accompanying drawing, wherein:

Figure 1 shows a side view of the apparatus illustrated diagrammatically.

Figure 2 shows a side view partly in section of another embodiment shown, in part, diagrammatically, and Figure 3 shows a transverse sectional view taken on the line 3—3 of Figure 2.

Referring now more particularly to the drawing, wherein like numerals of reference designate the same parts in each of the figures, the numeral 1 designates a source of electrical energy such as an electrical battery, which is wired in circuit with a galvanometer as 2 and a potentiometer, or variable resistance, 3. The battery, galvanometer and potentiometer are wired in circuit with a solenoid 4, through the electrical conductors 5, 6. Associated with the solenoid 4, there is a permanent magnet 7.

In the form shown in Figure 1, there is a beam 8 which may be suspended by a fine filament 9, from a suitable frame 10, which frame also supports the permanent magnet such as shown in said figure. The numeral 11 designates any suitable type of indicator, illustrated diagrammatically, and provided for the purpose of indicating the position of the beam 8, that is, whether it is or is not in perfect balance. The relatively movable parts of this indicator are carried by the frame 10 and the corresponding end of the beam 8 respectively. Suspended from the other end of the beam there is a weight 12 and said last mentioned end of the beam is connected to the solenoid 4.

Gravity will tend to constantly move the weight 12 downwardly but the influence of the corresponding solenoid, as controlled by the potentiometer, will counteract this gravity influence and the electromotive force required to counteract the gravity influence on the weight 12 and to keep the beam 8 in perfect balance, will be indicated by the corresponding resistance meter, such as the galvanometer 2. Readings should be taken only when the beam is in perfect balance as indicated by the indicator 11 and therefore variations in the gravity influence on the weight 12 at different locations can readily be ascertained by the readings of the galvanometer and consequently variations in the formation beneath the surface of the earth can thus be readily ascertained.

In the embodiment illustrated in Figures 2 and 3, the numeral 13 designates a supporting frame in which there is provided a tube 14 of light material and which connects the corresponding solenoid 4 with the weight 12a carried by the lower end of said tube.

The tube and weight are yieldingly supported and held centered by means of a suitable yieldable support, as 15. As illustrated, this support is in the form of an involute spring one end of which is attached to the tube 14 and whose outer, or free, end is secured to oppositely-disposed inwardly extended arms 16, 16 attached to the frame 13. In this form there is a balanced lever 17 mounted on the upstanding pivot 18 and balanced by means of the weight 19 on the inner end of said lever 17. The inner end of the lever 17 is connected to the lower end of the tube 14 by a flexible link 18a and on the outer end of the lever there is a mirror 19a, positioned to receive and reflect rays of light from a light source 20 carried by the frame 13. The mirror is positioned to reflect a beam of light onto a scale 21, at the upper end of the frame and forming an indicator which may be inspected through the eye piece 22.

In the form shown in Figure 2, gravity will tend constantly to move the weight 12a downwardly but the influence of the corresponding solenoid, as controlled by the potentiometer, will counteract this gravity influence and the electromotive force required to counteract the gravity influence on the weight 12a and to thus keep the lever 17 in perfect balance will be indicated by the corresponding resistance meter, such as the galvanometer 2. Readings should be taken only when the beam of light reflected from the mirror 19a indicates on the indicator 21 that the beam is in perfect balance. Variations in the gravity influence on the weight 12a at different locations may thus be ascertained by the readings of the galvanometer and consequently variations in the formation beneath the surface of the earth can thus be readily determined.

The spring 15 is merely a yieldable support or guide and will have no effect on the calibration or use of the instrument, since the instrument will be so constructed that said spring or guide will be in a position of inertia when the indicator shows the lever 17 to be in a state of balance and will impose no stresses or strains on the tube 14 and its appendants. Any guide which will cause the tube and solenoid carried thereby to follow a path, when in movement, at right angles to the lines of force in the air gap of the permanent magnet may be substituted for the coil spring 15.

In operation, the lifting effect of the solenoid is developed by flowing a uni-directional electrical current through the turns of the solenoid. Since the attraction or repulsion of one magnetic field to another is directly proportionate to the strength of the respective magnetic fields, provision is made to maintain the field strength of the permanent magnet constant, or approximately so, and provision is made to vary the field developed in the solenoid by flowing electrical currents of different intensities through the solenoid to overcome varying gravity forces on the weight, or mass, to which the solenoid is connected. Accordingly, by measuring or determining variations in the current through the movable solenoid required to overcome the varying forces of gravity at different locations, variations in the formation beneath the surface of the earth at said locations, can be determined.

It is contemplated, of course, that provision will be made for maintaining the instrument and its operating parts under an approximately constant temperature slightly higher than the surrounding atmospheric temperature by any conventional equipment for that purpose.

What I claim is:

1. A gravity meter comprising a vertically movable weight which is affected by gravity, means for guiding the weight including an involute spring formed in a substantially horizontal plane, with one end connected to the weight and the other end to a support, a solenoid connected to the weight, a permanent magnet adapted to cooperate with the solenoid to support the weight, means for indicating the vertical position of the weight.

2. A gravity meter comprising a vertically movable weight which is affected by gravity, means for guiding the weight including an involute spring formed in a substantially horizontal plane, with one end connected to the weight and the other end to a support, a solenoid connected to the weight, a permanent magnet adapted to cooperate with the solenoid to support the weight, optical means for indicating the vertical position of the weight, means for varying an electrical current passing through the solenoid, means for measuring said current.

3. A gravity meter comprising a weight, an involute spring formed in a substantially horizontal plane, means for supporting an end of the spring, the other end being connected to the weight, the spring thereby forming a guide for the weight, means including a solenoid for movably supporting the weight, means for indicating the vertical position of the weight.

4. A gravity meter comprising a weight, an involute spring formed in a substantially horizontal plane, means for supporting one end of the spring, the other end of the spring being connected to the weight, the spring thereby forming a guide for the weight, a solenoid connected to the weight, a permanent magnet adapted to cooperate with the solenoid to support the weight, means for indicating the vertical position of the weight, means for varying an electric current passing through the solenoid.

5. A device of the character described comprising a weight, an involute spring formed in a substantially horizontal plane, means for supporting one end of the spring, the other end of the spring being connected to the weight, the spring thereby forming a guide for the weight, a solenoid connected to the weight, a permanent magnet adapted to cooperate with the solenoid to support the weight, a pivotally mounted balanced lever connected at one end to the weight and a mirror on the other end, a light adapted to shine on the mirror, a scale on which the light from the mirror is reflected to show the position of the lever, means for varying an electric current passing through the solenoid.

6. In a gravity meter including a vertically movable weight, and means for determining the gravitational force acting on the weight; means for guiding the weight comprising an involute spring formed in a substantially horizontal plane, means for supporting the spring in horizontal plane by one end thereof, the other end of the spring being connected to the weight to guide the same.

7. A gravity meter comprising a weight, a solenoid, a magnet associated with the solenoid, means for guiding the movement of the solenoid and weight, said solenoid and magnet supplying the sole supporting force for the weight when the weight is in reading position, means for supplying an electric current to the solenoid, and means for determining the position of the weight.

TRUMAN S. MORRIS.